UNITED STATES PATENT OFFICE 2,545,963

PROCESS FOR PRODUCING ASPHALT COMPOSITIONS

Charles Mack, Sarina, Ontario, Canada, assignor to Standard Oil Development Company, a corporation of Delaware No Drawing. Application December 2, 1948, Serial No. 63,191

5 Claims. (Cl. 196—22)

This invention relates to an improved process for producing bituminous compositions having improved flow properties and softening point relationships. In accordance with this invention, asphalts are improved by reacting them with vinyl compounds in the presence of a suitable catalyst.

Particularly in the utilization of asphalt compositions for road paving material, it is important that the composition employed have suitable flow properties. If an asphalt pavement were rigid and subjected to a decrease in temperature amounting to 30° F. between the surface and the bottom, the internal stress at the bottom of the pavement would be of the order of 300 lbs. per square inch, and the pavement would crack. In order to prevent cracking, the internal stresses must relax. Since the mineral aggregate contained in the paving composition is unyielding, stress relaxation must occur through flow of the asphalt. It is therefore the principal object of this invention to provide an asphalt paving composition having the indicated desirable characteristics.

It can be logically deduced that the stresses set up in a series of asphalts of the same viscosities and varying flow properties relax at the greatest rate in asphalts of Newtonian or viscous flow properties (cf. C. Mack, Plastic flow, creep and stress relaxation, pt. I-III, Journal of Applied Physics, vol. 17, pp. 1086–1107, 1946). This has also been verified experimentally (cf. C. Mack, Rheology of bituminous mixtures relative to the properties of asphalts, Proceedings of the Association of Asphalt Paving Technologists, vol. 13, pp. 194–255, 1942). It is, therefore, a more specific object of this invention to provide means for treating a plastic asphalt so that it will act like a Newtonian or viscous liquid.

It has been determined that the flow properties of an asphalt composition may be readily ascertained by laboratory tests which depend upon determining the softening point and penetration of the asphalts. Given the softening point and penetration of a particular asphalt, the flow properties may be expressed by a constant $C$ defined by the following formula: $C = d \log \text{penetration}/d \log \text{time}$. In evaluating this formula, a composition having the characteristics of a Newtonian fluid will be found to have a constant $C$ of 0.5. Consequently, it is relatively simple to evaluate the flow properties of an asphalt by application of the above formula.

The principle upon which the present invention is based is believed to relate to the asphaltene composition of the asphalt. It is known that typical asphalts contain about 10–20% of asphaltenes. These asphaltenes are characterized by the tendency to agglomerate. It is believed that this agglomeration of asphaltenes is responsible for adversely affecting the flow properties of asphalt compositions. It is therefore desirable in securing a good asphalt composition to either prevent agglomeration of the asphaltenes in some manner or to remove the asphaltenes. In accordance with this invention it has been found possible to react the asphaltenes with particular organic compounds so as to suitably alter the character of these asphaltenes in order to favorably influence the flow properties of the asphalt. By treating asphalts with the organic compounds herein disclosed, it is possible to cause the asphalt to more nearly approach the flow properties of a Newtonian fluid.

The organic compounds which are employed in the treatment of asphalts according to this invention, are broadly, any vinyl compound together with a small amount of an organic peroxide which acts as a catalyst for the reaction. Suitable vinyl compounds are, for example, vinyl chloride, vinyl acetate and an acrylonitrile. Suitable organic peroxides are, for example, benzoyl peroxide, cumene hydroperoxide, turpentine peroxide, and generally, any organic olefinic peroxide. In the practice of this invention, from about 0.5 to 5% of a particular vinyl compound together with about 2% to 5% of the organic olefinic peroxide, based on the vinyl compound, are employed. The temperature range employed is preferably about 160 to 200° F. although an appreciable reaction is found to occur even at room temperatures. The time of reaction is about ½ to 4 hours. It is preferred that the vinyl compound and the catalyst be added to the asphalt in a suitable solvent such as inert aliphatic or aromatic hydrocarbons such as hexane, heptane, and benzene. Sufficient solvent is generally employed to suitably dissolve the vinyl compound and the organic peroxide. After the reaction has been completed the solvent may be distilled off and the resulting asphalt may be used as desired to prepare road surfacing compositions. It has been found that by reacting asphalts according to the process described that the vinyl compounds appear to react principally with the asphaltenes present. This was deduced from the fact that the amount of asphaltenes which are normally insoluble in naphtha has been found to be reduced by 20–30% after the reaction with the vinyl compounds. It is a particular feature of this invention that the reaction with vinyl compounds does not materially affect the softening point of the asphalt.

The nature of the process of this invention will be more fully understood from the following examples showing the application of this invention to the treatment of typical asphalts. In each example, the asphalts were subjected to two tests. The first test was the test for softening point known as the ring and ball test and identified as A. S. T. M. test D36–26, A. S. T. M. Standards 1936, II, 1098. The second test is a test for evaluating the penetration of the asphalts and is identified as A. S. T. M. test D5–25, A. S. T. M. Standards 1936, II, 1080. Having the softening point and penetration of a particular asphalt composition as determined by these tests, it is possible to evaluate the above indicated formula to determine the flow properties of the asphalt. In considering the following examples of the application of this invention, it will be recalled that the optimum flow properties of the asphalt are obtained when the constant C obtained from the formula is 0.5. Similarly the more nearly the constant C may be caused to approach the value of 0.5, the more desirable the flow properties of the asphalt.

*Example 1*

A cracking coil tar asphalt was subjected to the ring and ball test and the penetration test to determine the constant C, identifying the flow properties of the asphalt. It was found the softening point was 108° F., the penetration at 77° F. was 108, and the constant C was 0.515. This data indicated that the cracking coil tar was thixotropic in nature.

*Example 2*

The cracking coil tar asphalt of Example 1 was reacted with 1.7% of acrylonitrile together with 2% of benzoyl peroxide based on the weight of the acrylonitrile. The reaction was carried out at 160° F. to 180° F. for 1 hour. The acrylonitrile and benzoyl peroxide were added in a benzene solution. At the end of one hour the benzene was distilled off. It was found the softening point of the resulting asphalt was 106° F. the penetration was 120 at 77° F., and the constant C was 0.50. It is thus to be seen that by this treatment an initially thixotropic asphalt was caused to have the flow properties of a Newtonian fluid.

*Example 3*

100 parts by weight of the asphalt of Example 1 were heated to 160° F. and mixed with a solution of 1.7% vinyl acetate and 2% of benzoyl peroxide, both dissolved in 25 parts by volume of benzene. The temperature was maintained at 180° F. for 1 hour, after which the benzene was distilled off. On testing the resulting asphalt it was determined that the softening point of this asphalt was 107° F., the penetration was 112 and again the constant C was 0.50.

*Example 4*

3% of styrene and 2% of benzoyl peroxide based on the weight of the styrene were added to the asphalt of Example 1 in the form of a benzene solution. The mixture was maintained at 180° F. for 1 hour and the solvent was finally distilled off. The asphalt composition had a softening point of 109° F., a penetration of 115, and a constant C of 0.50.

*Example 5*

An oxidized Mid-Continent asphalt was tested for softening point and penetration according to the above identified tests. The softening point was 130° F., and the penetration at 77° F. was 49, resulting in a constant C of 0.385.

*Example 6*

The asphalt of Example 5 was reacted with 1% of acrylonitrile together with 2% of benzoyl peroxide based on the weight of the acrylonitrile. The acrylonitrile and benzoyl peroxide were added to 100 parts by weight of asphalt in 25 parts by volume of benzene. The mixture was maintained at 180° F. for 1 hour at the end of which time, the benzene was distilled off. The asphalt then had a softening point of 125° F., a penetration of 78, and a constant C of 0.46.

*Example 7*

The asphalt of Example 5 was reacted with vinyl acetate and benzoyl peroxide as in the former examples. 1% of vinyl acetate and 2% of benzoyl peroxide based on the weight of the vinyl acetate were employed. It was found the asphalt had a softening point of 128° F., a penetration of 52, and a constant C of 0.42.

As will be seen from Examples 6 and 7 the flow properties of the oxidized Mid-Continent asphalt employed were improved to more nearly approach the flow properties of Newtonian fluid.

Having now fully described this invention, what is claimed is:

1. A process for improving the flow properties of asphalts which comprises reacting an asphalt with 0.5 to 5% by weight of a vinyl compound in the presence of an organic peroxide, the said peroxide being used in amounts of about 2%–5% by weight of the vinyl compound.

2. The process defined by claim 1 in which the vinyl compound is selected from the class consisting of vinyl chloride, vinyl acetate, acrylonitrile and styrene.

3. The process defined by claim 1 in which the peroxide is selected from the class consisting of benzoyl peroxide, cumene hydroperoxide, and turpentine peroxide.

4. The process defined by claim 1 in which the said reaction is conducted at a temperature below 200° F. for a period of about ½ to 4 hours.

5. The process defined by claim 1 in which the said vinyl compound and the said peroxide are added to the asphalt in a solution of the said compounds in an inert hydrocarbon.

CHARLES MACK.

REFERENCES CITED

The following references are of record in the file of this patent:

UNITED STATES PATENTS

| Number | Name | Date |
|---|---|---|
| 2,155,590 | Garvey | Apr. 25, 1939 |
| 2,232,595 | Dittmar et al. | Feb. 18, 1941 |